(12) United States Patent
Li et al.

(10) Patent No.: US 8,355,473 B2
(45) Date of Patent: Jan. 15, 2013

(54) METHODS AND SYSTEMS WITH SIMPLIFIED DOPPLER SPREAD CLASSIFICATION

(75) Inventors: Junqiang Li, Sunnyvale, CA (US); Je Woo Kim, Cupertino, CA (US); Madihally J. Narasimha, Saratoga, CA (US)

(73) Assignee: QUALCOMM Incorporated, San Diego, CA (US)

( * ) Notice: Subject to any disclaimer, the term of this patent is extended or adjusted under 35 U.S.C. 154(b) by 751 days.

(21) Appl. No.: 12/426,257

(22) Filed: Apr. 19, 2009

(65) Prior Publication Data

US 2010/0266077 A1    Oct. 21, 2010

(51) Int. Cl.
*H03D 1/04* (2006.01)
(52) U.S. Cl. ........ 375/346; 375/260; 375/325; 375/340; 375/324; 375/326; 375/E1.015; 342/99; 342/357.63; 342/357.78; 342/418
(58) Field of Classification Search ............... 375/260, 375/325, 340, 346, 324, 326, E1.015; 342/999, 342/105, 171, 357.18, 418, 99, 357.63, 357.78
See application file for complete search history.

(56) References Cited

U.S. PATENT DOCUMENTS

| | | | | |
|---|---|---|---|---|
| 6,640,088 B2 * | 10/2003 | Thomas et al. | ............ | 455/67.11 |
| 7,813,437 B2 * | 10/2010 | Mudulodu et al. | ............ | 375/260 |
| 7,912,115 B2 * | 3/2011 | Zhao et al. | ............ | 375/219 |
| 7,925,286 B2 * | 4/2011 | Demaj | ............ | 455/504 |
| 2006/0239364 A1 * | 10/2006 | Wilhelmsson | ............ | 375/260 |
| 2007/0046527 A1 | 3/2007 | Sundaralingam et al. | | |
| 2009/0197535 A1 | 8/2009 | Roh et al. | | |
| 2010/0080309 A1 * | 4/2010 | Moffatt et al. | ............ | 375/260 |
| 2010/0246527 A1 * | 9/2010 | Montojo et al. | ............ | 370/330 |
| 2011/0032837 A1 * | 2/2011 | Luschi et al. | ............ | 370/252 |

FOREIGN PATENT DOCUMENTS

WO    WO2007036866    4/2007

OTHER PUBLICATIONS

Souden et al. A two-ray spectrum-approximation approach to Doppler spread estimation with robustness to the carrier frequency offset;SPAWC 2008;pp. 31-35.*
International Search Report and Written Opinion—PCT/US2010/031500, International Search Authority—European Patent Office—Jul. 26, 2010.

* cited by examiner

*Primary Examiner* — David Ometz
*Assistant Examiner* — Rahel Guarino
(74) *Attorney, Agent, or Firm* — Tyler J. Overall

(57) ABSTRACT

Certain embodiments of the present disclosure propose methods and systems for classifying the Doppler spread based on the output of the frequency-tracking loop (FTL) discriminator in WiMAX systems to improve the performance of the channel estimation. The Doppler spread may be classified as low, medium or high based on the statistics of the output of the discriminator in the fine-tracking mode.

12 Claims, 17 Drawing Sheets

Input

Discriminator(D=2)

Output

| CINR(dB) | -5 | 0 | 5 | 10 | 15 | 20 |
|---|---|---|---|---|---|---|
| Weakening factor | 1/3.5 | 1/2.2 | 1/1.4 | 1 | 1 | 1 |
| Forgetting factor | 1/128 | 1/64 | 1/64 | 1/64 | 1/64 | 1/64 |

METHODS AND SYSTEMS WITH SIMPLIFIED DOPPLER SPREAD CLASSIFICATION

TECHNICAL FIELD

Certain embodiments of the present disclosure generally relate to wireless communications and, more particularly, to classifying Doppler spread.

SUMMARY

Certain embodiments of the present disclosure provide a method for wireless communications. The method generally includes receiving a wireless signal, estimating a frequency offset of a carrier frequency used to transmit the wireless signal over a wireless channel, estimating a Doppler spread of the wireless channel using the estimated frequency offset, and classifying the Doppler spread based on the estimated Doppler spread and at least one threshold value.

Certain embodiments of the present disclosure provide an apparatus for wireless communications. The apparatus generally includes logic for receiving a wireless signal, logic for estimating a frequency offset of a carrier frequency used to transmit the wireless signal over a wireless channel, logic for estimating a Doppler spread of the wireless channel using the estimated frequency offset, and logic for classifying the Doppler spread based on the estimated Doppler spread and at least one threshold value.

Certain embodiments of the present disclosure provide an apparatus for wireless communications. The apparatus generally includes means for receiving a wireless signal, means for estimating a frequency offset of a carrier frequency used to transmit the wireless signal over a wireless channel, means for estimating a Doppler spread of the wireless channel using the estimated frequency offset, and means for classifying the Doppler spread based on the estimated Doppler spread and at least one threshold value.

Certain embodiments of the present disclosure provide a computer-program product for wireless communications, comprising a computer readable medium having instructions stored thereon, the instructions being executable by one or more processors. The instructions generally include instructions for receiving a wireless signal, instructions for estimating a frequency offset of a carrier frequency used to transmit the wireless signal over a wireless channel, instructions for estimating a Doppler spread of the wireless channel using the estimated frequency offset, and instructions for classifying the Doppler spread based on the estimated Doppler spread and at least one threshold value.

BRIEF DESCRIPTION OF THE DRAWINGS

So that the manner in which the above-recited features of the present disclosure can be understood in detail, a more particular description, briefly summarized above, may be had by reference to embodiments, some of which are illustrated in the appended drawings. It is to be noted, however, that the appended drawings illustrate only certain typical embodiments of this disclosure and are therefore not to be considered limiting of its scope, for the description may admit to other equally effective embodiments.

FIG. 9 illustrates adaptive weakening factors and forgetting factors versus carrier to interference plus noise ratio (CINR) in accordance with certain embodiments of the present disclosure.

DETAILED DESCRIPTION

Figure 1:
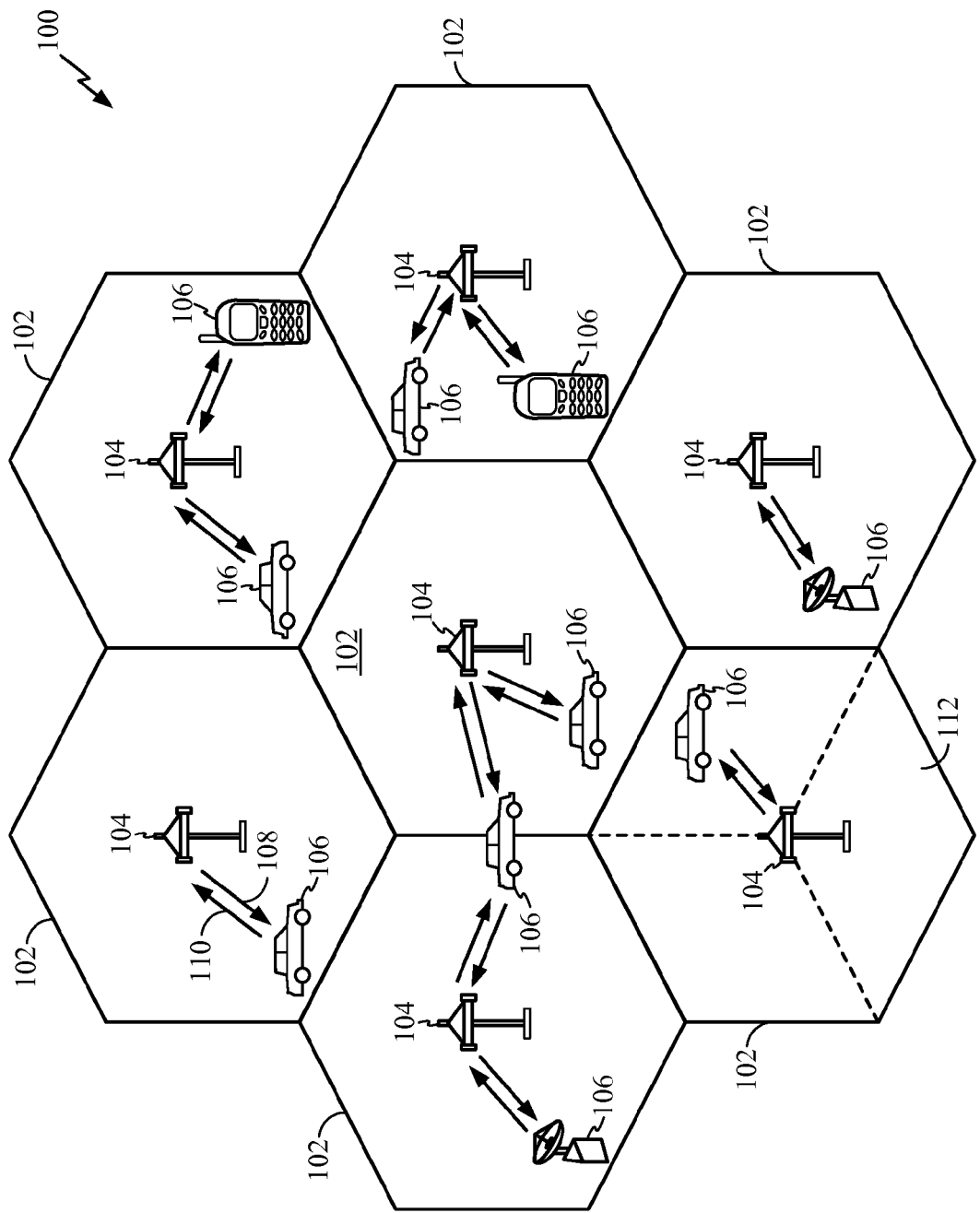
FIG. 1 illustrates an example wireless communication system, in accordance with certain embodiments of the present disclosure.

The word "exemplary" is used herein to mean "serving as an example, instance, or illustration." Any embodiment described herein as "exemplary" is not necessarily to be construed as preferred or advantageous over other embodiments.

Information regarding a wireless channel, such as signal to noise ratio (SNR), Doppler and delay spread, are very useful for channel estimation. The SNR and delay spread may be estimated in the demodulation and TTL (Time tracking loop) modules. However, it is not easy to estimate the Doppler in WiMAX system because of the flexible permutation zone assignment. In the present disclosure, a simple Doppler spread classification method based on the Frequency Tracking Loop (FTL) discriminator is proposed for WiMAX systems to improve the performance of channel estimation. The Doppler spread may be classified as low, medium or high based on the statistics of the output of the discriminator in the fine-tracking mode.

High order modulations such as 16 QAM and 64 QAM are much more sensitive to the channel estimation error than low order modulations such as QPSK. Therefore, it is important to classify the Doppler spread correctly at medium to high range carrier to interference noise ratio (e.g., CINR>10 dB) which is the operation point for 16 QAM and 64 QAM in fading channels.

Exemplary Wireless Communication System

The techniques described herein may be used for various broadband wireless communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

One example of a communication system based on an orthogonal multiplexing scheme is a WiMAX system. WiMAX, which stands for the Worldwide Interoperability for Microwave Access, is a standards-based broadband wireless technology that provides high-throughput broadband connections over long distances. There are two main applications of WiMAX today: fixed WiMAX and mobile WiMAX. Fixed WiMAX applications are point-to-multipoint, enabling broadband access to homes and businesses, for example. Mobile WiMAX is based on OFDM and OFDMA and offers the full mobility of cellular networks at broadband speeds.

IEEE 802.16x is an emerging standard organization to define an air interface for fixed and mobile broadband wireless access (BWA) systems. These standards define at least four different physical layers (PHYs) and one media access control (MAC) layer. The OFDM and OFDMA physical layer of the four physical layers are the most popular in the fixed and mobile BWA areas, respectively.

FIG. 1 illustrates an example of a wireless communication system 100 in which embodiments of the present disclosure may be employed. The wireless communication system 100 may be a broadband wireless communication system. The wireless communication system 100 may provide communication for a number of cells 102, each of which is serviced by a base station 104. A base station 104 may be a fixed station that communicates with user terminals 106. The base station 104 may alternatively be referred to as an access point, a Node B or some other terminology.

FIG. 1 depicts various user terminals 106 dispersed throughout the system 100. The user terminals 106 may be fixed (i.e., stationary) or mobile. The user terminals 106 may alternatively be referred to as remote stations, access terminals, terminals, subscriber units, mobile stations, stations, user equipment, etc. The user terminals 106 may be wireless devices, such as cellular phones, personal digital assistants (PDAs), handheld devices, wireless modems, laptop computers, personal computers, etc.

A variety of algorithms and methods may be used for transmissions in the wireless communication system 100 between the base stations 104 and the user terminals 106. For example, signals may be sent and received between the base stations 104 and the user terminals 106 in accordance with OFDM/OFDMA techniques. If this is the case, the wireless communication system 100 may be referred to as an OFDM/OFDMA system.

A communication link that facilitates transmission from a base station 104 to a user terminal 106 may be referred to as a downlink 108, and a communication link that facilitates transmission from a user terminal 106 to a base station 104 may be referred to as an uplink 110. Alternatively, a downlink 108 may be referred to as a forward link or a forward channel, and an uplink 110 may be referred to as a reverse link or a reverse channel.

A cell 102 may be divided into multiple sectors 112. A sector 112 is a physical coverage area within a cell 102. Base stations 104 within a wireless communication system 100 may utilize antennas that concentrate the flow of power within a particular sector 112 of the cell 102. Such antennas may be referred to as directional antennas.

Figure 2:
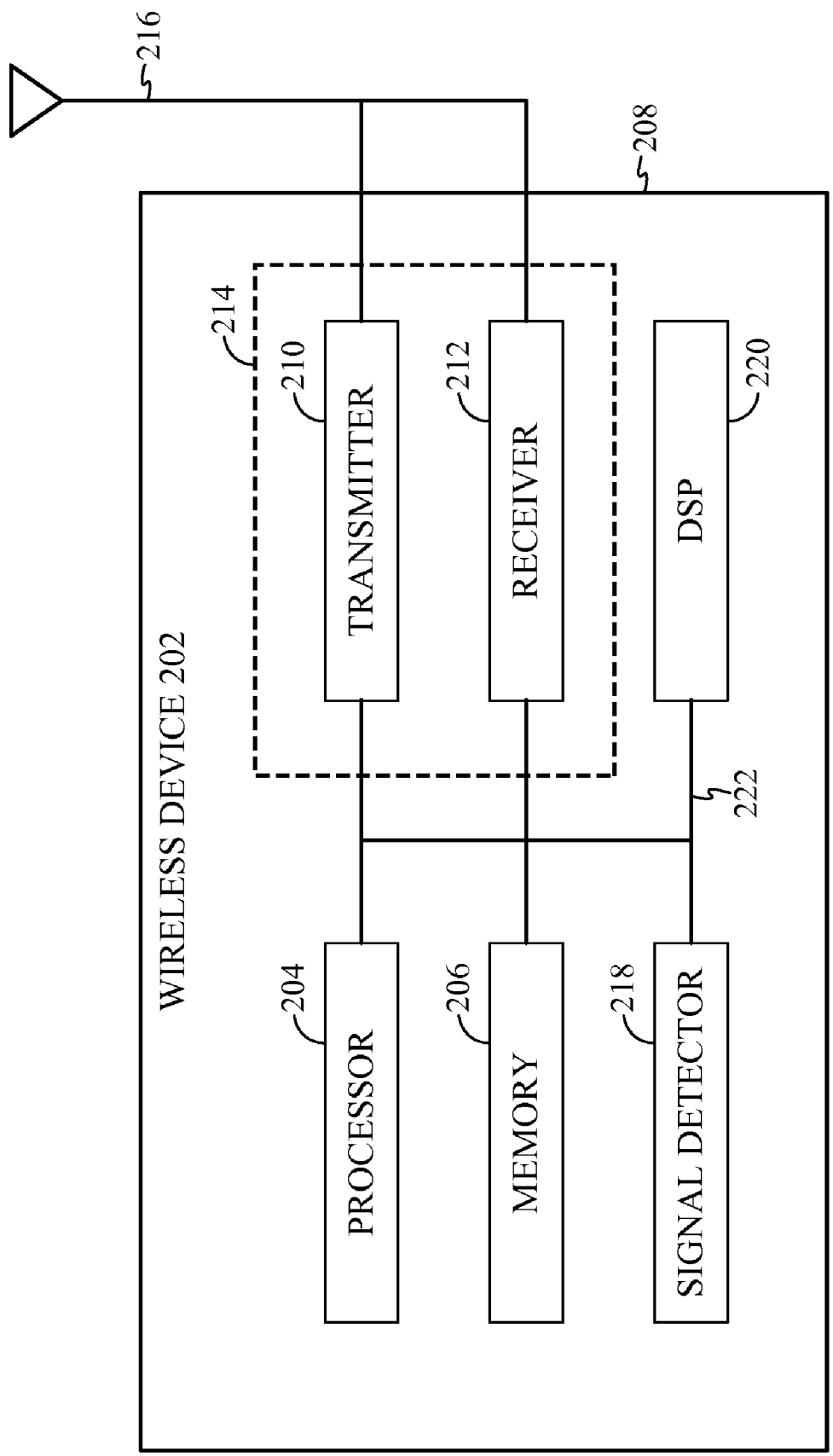
FIG. 2 illustrates various components that may be utilized in a wireless device in accordance with certain embodiments of the present disclosure.

FIG. 2 illustrates various components that may be utilized in a wireless device 202 that may be employed within the wireless communication system 100. The wireless device 202 is an example of a device that may be configured to implement the various methods described herein. The wireless device 202 may be a base station 104 or a user terminal 106.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The wireless device 202 may also include a signal detector 218 that may be used in an effort to detect and quantify the level of signals received by the transceiver 214. The signal detector 218 may detect such signals as total energy, pilot energy per pseudonoise (PN) chips, power spectral density and other signals. The wireless device 202 may also include a digital signal processor (DSP) 220 for use in processing signals.

The various components of the wireless device 202 may be coupled together by a bus system 222, which may include a power bus, a control signal bus, and a status signal bus in addition to a data bus.

Figure 3:
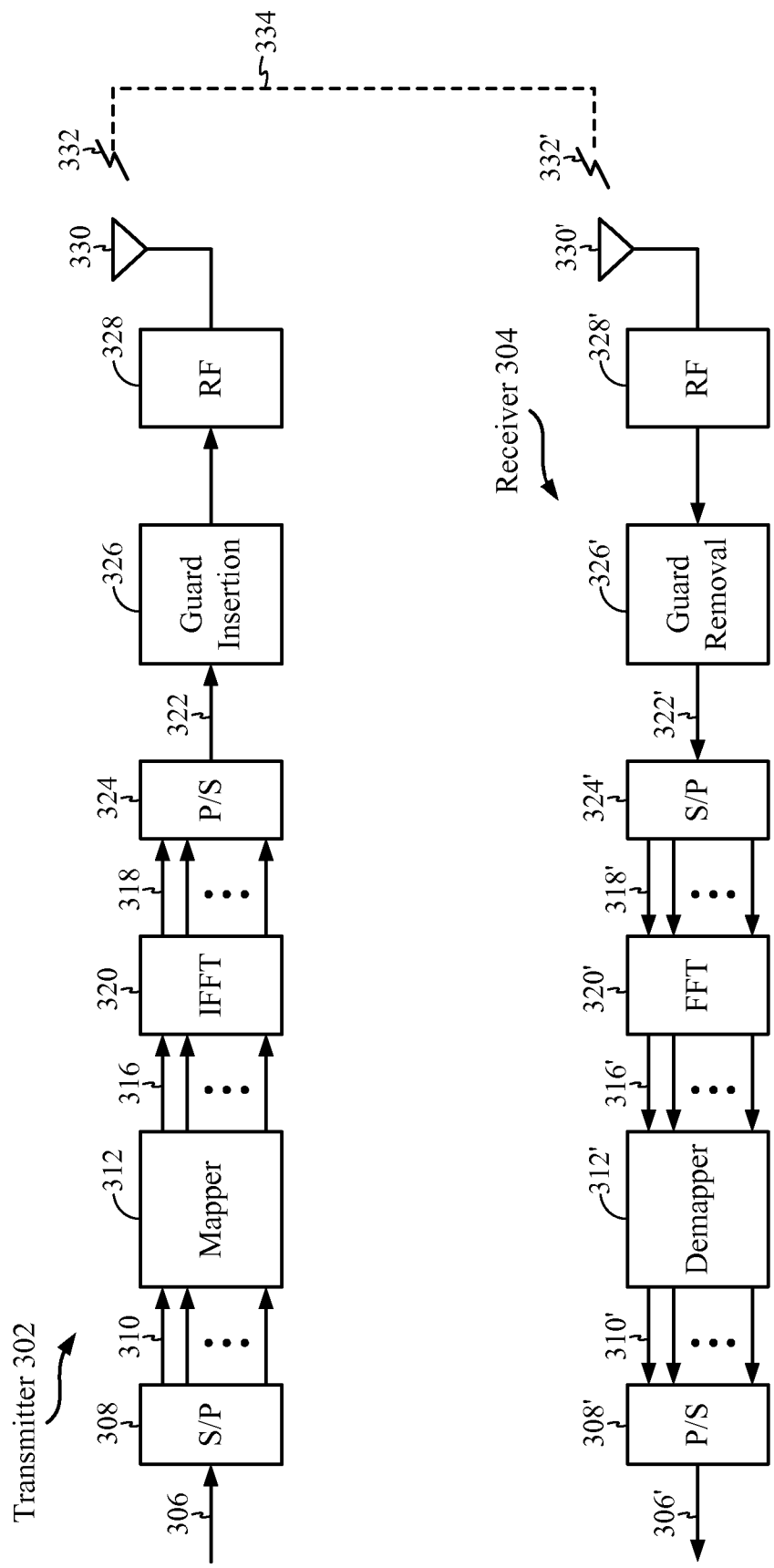
FIG. 3 illustrates an example transmitter and an example receiver that may be used within a wireless communication system that utilizes orthogonal frequency-division multiplexing and orthogonal frequency division multiple access (OFDM/OFDMA) technology in accordance with certain embodiments of the present disclosure.

FIG. 3 illustrates an example of a transmitter 302 that may be used within a wireless communication system 100 that utilizes OFDM/OFDMA. Portions of the transmitter 302 may be implemented in the transmitter 210 of a wireless device 202. The transmitter 302 may be implemented in a base station 104 for transmitting data 306 to a user terminal 106 on a downlink 108. The transmitter 302 may also be implemented in a user terminal 106 for transmitting data 306 to a base station 104 on an uplink 110.

Data 306 to be transmitted is shown being provided as input to a serial-to-parallel (S/P) converter 308. The S/P converter 308 may split the transmission data into N parallel data streams 310.

The N parallel data streams 310 may then be provided as input to a mapper 312. The mapper 312 may map the N parallel data streams 310 onto N constellation points. The mapping may be done using some modulation constellation, such as binary phase-shift keying (BPSK), quadrature phase-shift keying (QPSK), 8 phase-shift keying (8PSK), quadrature amplitude modulation (QAM), etc. Thus, the mapper 312 may output N parallel symbol streams 316, each symbol stream 316 corresponding to one of the N orthogonal subcarriers of the inverse fast Fourier transform (IFFT) 320. These N parallel symbol streams 316 are represented in the frequency domain and may be converted into N parallel time domain sample streams 318 by an IFFT component 320.

A brief note about terminology will now be provided. N parallel modulations in the frequency domain are equal to N modulation symbols in the frequency domain, which are equal to N mapping and N-point IFFT in the frequency domain, which is equal to one (useful) OFDM symbol in the time domain, which is equal to N samples in the time domain. One OFDM symbol in the time domain, $N_s$, is equal to $N_{cp}$ (the number of guard samples per OFDM symbol)+N (the number of useful samples per OFDM symbol).

The N parallel time domain sample streams 318 may be converted into an OFDM/OFDMA symbol stream 322 by a parallel-to-serial (P/S) converter 324. A guard insertion component 326 may insert a guard interval between successive OFDM/OFDMA symbols in the OFDM/OFDMA symbol stream 322. The output of the guard insertion component 326 may then be upconverted to a desired transmit frequency band by a radio frequency (RF) front end 328. An antenna 330 may then transmit the resulting signal 332.

FIG. 3 also illustrates an example of a receiver 304 that may be used within a wireless device 202 that utilizes OFDM/OFDMA. Portions of the receiver 304 may be implemented in the receiver 212 of a wireless device 202. The receiver 304 may be implemented in a user terminal 106 for receiving data 306 from a base station 104 on a downlink 108. The receiver 304 may also be implemented in a base station 104 for receiving data 306 from a user terminal 106 on an uplink 110.

The transmitted signal 332 is shown traveling over a wireless channel 334. When a signal 332' is received by an antenna 330', the received signal 332' may be downconverted to a baseband signal by an RF front end 328'. A guard removal component 326' may then remove the guard interval that was inserted between OFDM/OFDMA symbols by the guard insertion component 326.

The output of the guard removal component 326' may be provided to an S/P converter 324'. The S/P converter 324' may divide the OFDM/OFDMA symbol stream 322' into the N parallel time-domain symbol streams 318', each of which corresponds to one of the N orthogonal subcarriers. A fast Fourier transform (FFT) component 320' may convert the N parallel time-domain symbol streams 318' into the frequency domain and output N parallel frequency-domain symbol streams 316'.

A demapper 312' may perform the inverse of the symbol mapping operation that was performed by the mapper 312 thereby outputting N parallel data streams 310'. A P/S converter 308' may combine the N parallel data streams 310' into a single data stream 306'. Ideally, this data stream 306' corresponds to the data 306 that was provided as input to the transmitter 302.

Exemplary Simplified Doppler Spread Classification based on FTL Discriminator

In an OFDM system, the received signal in the frequency domain for the $k^{th}$ subcarrier may be expressed as:

$$Z_k = \frac{1}{\sqrt{N}} \sum_{n=0}^{N-1} z_n e^{-j2\pi \frac{nk}{N}}, \; 0 \le k \le N-1 \qquad (1)$$

where N is the number of the subcarriers and $z_n$ denotes the received time domain samples. This signal may be modeled as:

$$Z_k = H_k S_k + N_k \qquad (2)$$

where $H_k$ is the channel frequency response, $S_k$ is the transmitted data or pilot at the $k^{th}$ subcarrier, and $N_k$ is the noise and interference at the $k^{th}$ subcarrier.

Among the N subcarriers, it may be assumed that M subcarriers are modulated by pilot symbols, and $\Phi$ may represent a set of indexes of M pilot subcarriers, with D-1 OFDM symbols between the two OFDM symbols with similar pilot patterns.

Figure 4:
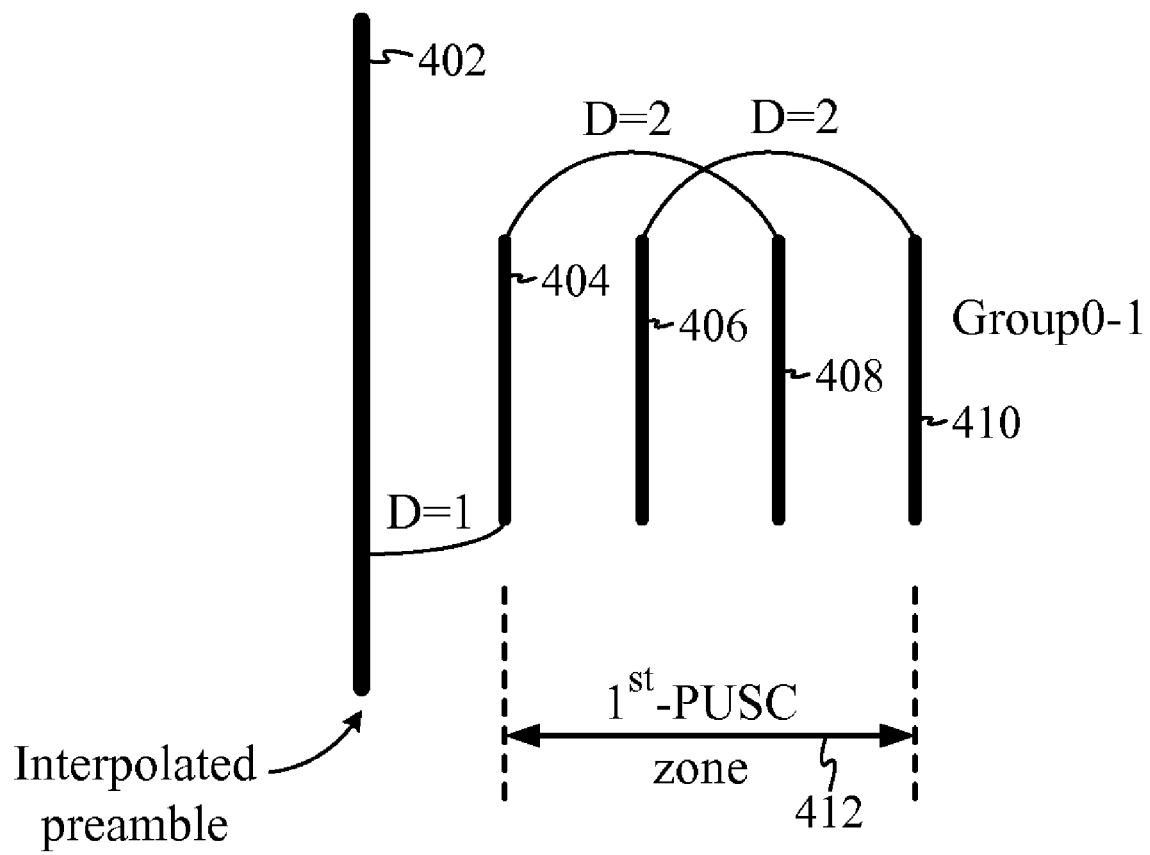
FIG. 4 illustrates a pilot correlation with four OFDM symbols in a Partially Used Sub-Carrier (PUSC) zone in accordance with certain embodiments of the present disclosure.

FIG. 4 illustrates a pilot correlation with four OFDM symbols in a Partially Used Sub-Carrier (PUSC) zone 412 that follows the preamble symbol 402. The PUSC zone uses a distributed subcarrier allocation mode so that the subcarriers corresponding to a subchannel are spread across the signal bandwidth, thus providing frequency diversity. In the illustrated example, the symbol spacing between the interpolated preamble 402 and OFDM symbol 404 is one. The symbol spacing between the OFDM symbols 404 and 408 is equal to 2.

The parameter R(D) may be defined as:

$$R(D) = \sum_{k \in \Phi} (Z_{m+D,k} \cdot P_{m+D,k}) \cdot (Z_{m,k} \cdot P_{m,k})^* \qquad (3)$$

where m and m+D are the indexes of the OFDM symbols with similar pilot patterns in the frequency domain, $P_{m,k}$ and $P_{m+D,k}$ are the pilot symbols transmitted over the same subcarrier during the $m^{th}$ and $(m+D)^{th}$ OFDM symbols.

The normalized frequency offset, with respect to the subcarrier spacing, may be expressed as:

$$\delta_f = \frac{N}{2\pi D(N+G)} \cdot \theta \qquad (4)$$

where G is cyclic prefix length. The parameter $\theta$ may be defined as:

$$\theta = \arg(R(D)) \qquad (5)$$

where arg(.) is the angular component of R(D).

Equation (3) may be rewritten as:

$$R(D) = \sum_{k \in \Phi} (Z_{m+D,k} \cdot P_{m+D,k}) \cdot (Z_{m,k} \cdot P_{m,k})^* \qquad (6)$$

$$= \sum_{k \in \Phi}(H_{m+D,k}E_p + P_{m+D,k}N_{m+D,k}) \cdot (H_{m,k}E_p + P_{m,k}N_{m,k})^*$$

$$= E_p^2 \cdot \sum_{k \in \Phi} H_{m+D,k}H_{m,k}^* + \text{Noise}$$

where $E_p$ is the energy of the pilot symbol. For simplifying the analysis, it may be assumed that the Noise contribution in (6) approaches zero at high CINR (Carrier to Interference Noise Ratio), and the input frequency offset $\Delta f_{in}$ (i.e., the constant frequency offset due to oscillator) equals to zero. Therefore, the Eqn (6) may be simplified as:

$$R(D) = E_p^2 \cdot \sum_{k \in \Phi} H_{m+D,k}H_{m,k}^* \quad (7)$$

To get insight into the relationship between the measured frequency offset at the discriminator output and the instant Doppler (i.e., dynamic frequency offset) at the input of the discriminator, Eqn (7) may be used instead of Eqn (6).

In the following description, two extreme scenarios of the present disclosure are described to demonstrate the relationship between the FTL discriminator output and instant Doppler. The discriminator generally represents the residual frequency offset estimator of the frequency tracking loop.

In one scenario, a flat fading channel with one receive antenna may be assumed. The measurement period may be assumed to be equal to two symbols. The relationship between the measured frequency offset $\hat{\delta}_f$ at the discriminator output and the instant Doppler during certain D symbols may be obtained by:

$$\hat{\delta}_f = f_d \quad (8)$$

A multipath fading channel with two receive antennas may also be considered. The measurement period may be selected to be large enough (e.g., 4 or 6 symbols). Therefore, the term in the right hand side of Eqn (7) can be approximated by its expectation E(.), which is the channel autocorrelation:

$$\sum_{k \in \Phi} H_{m+D,k}H_{m,k}^* \approx M \cdot E(H_{m+D,k}H_{m,k}^*) \quad (9)$$

$$= M \cdot r_t(D)$$

where M is the number of elements in $\Phi$ in Eqn. (3). The autocorrelation function $r_t(D)$ of the Jakes channel model with instant Doppler (i.e., maximum Doppler during the measurement period, $f_d$) may be defined as:

$$r_t(D) = J_0(2\pi f_d D(T_u + T_g)) \quad (10)$$

where $J_0(\cdot)$ is the zeroth order Bessel function, and $T_u$ and $T_g$ are the useful OFDM symbol time and cyclic prefix duration, respectively.

Figure 5:
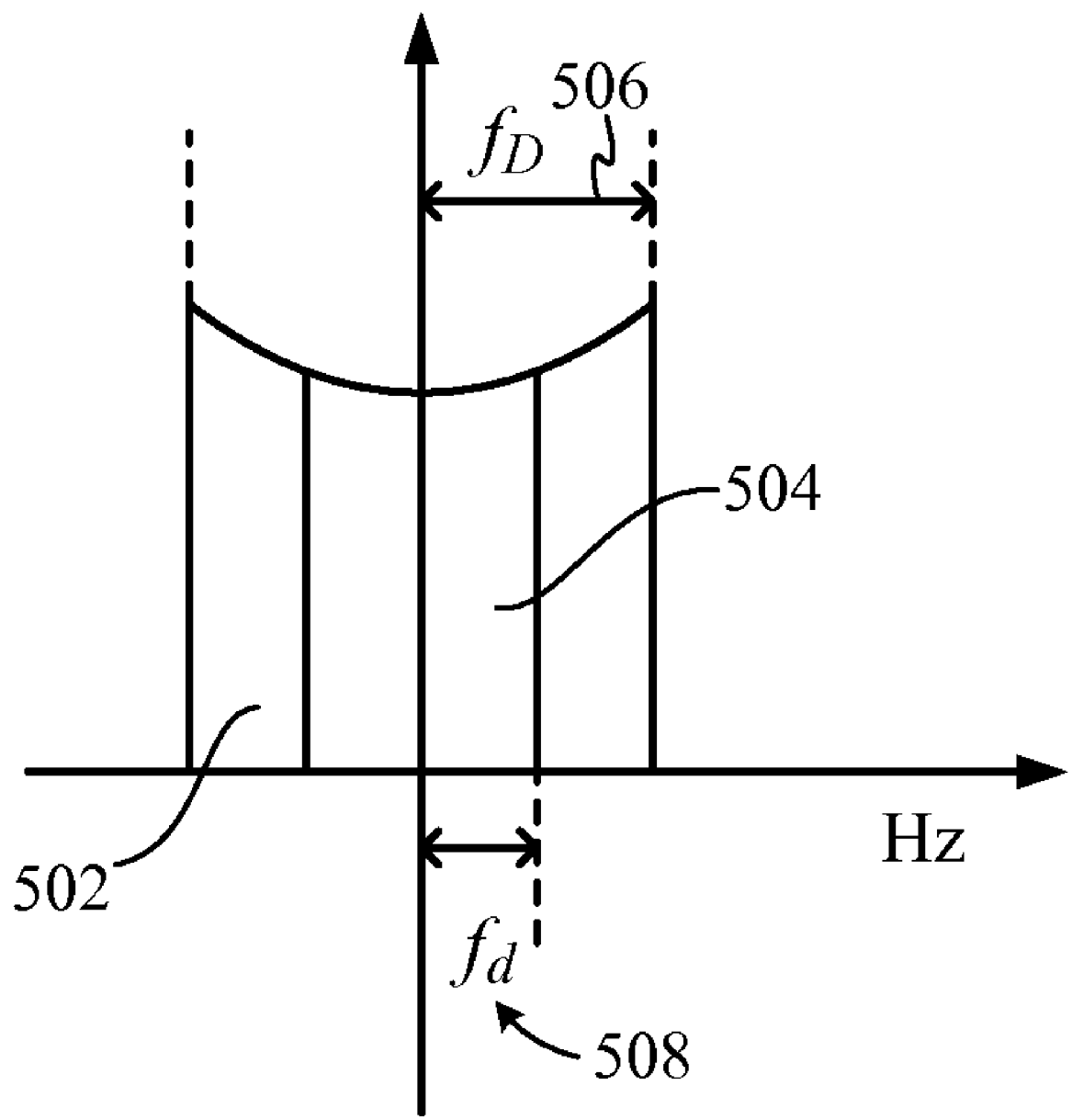
FIG. 5 illustrates instant channel Doppler versus maximum channel Doppler during D symbols.

FIG. 5 illustrates the relation between the instant channel Doppler $f_d$ 508 and the maximum channel Doppler $f_D$ 506 across D OFDM symbols. As illustrated, instant Doppler $f_d$ is always smaller than the maximum channel Doppler $f_D$.

By substituting Eqn (9) into Eqn (7), R (D) may be rewritten as:

$$R(D) = ME_p^2 \cdot r_t(D) \quad (11)$$

Since $r_t(D)$ is a real value, an estimate of $r_t(D)$ may be derived from Eqn (11) as following:

$$r_t(D) = \frac{Re\{R(D)\}}{ME_p^2} \quad (12)$$

In addition, the Taylor series expansion of $J_0(x)$ around $x=0$ is:

$$J_0(x) = \sum_{m=0}^{\infty} \frac{(-1)^m}{m!\Gamma(m+1)}\left(\frac{x}{2}\right)^{2m} \approx 1 - \left(\frac{x}{2}\right)^2 \quad (13)$$

Thus, the autocorrelation function in Eqn (10) with D=2 may be rewritten as:

$$r_t(D=2) \approx 1 - (2\pi f_d(T_u+T_g))^2 \quad (14)$$

Thus, by considering Eqns (12) and (14), an estimate of the instant Doppler may be obtained as:

$$f_d = \frac{\sqrt{1 - r_t(D=2)}}{2\pi(T_u+T_g)} \quad (15)$$

$$= \frac{\sqrt{1 - \frac{\|R\|\cos(\tilde{\theta})}{ME_p^2}}}{2\pi(T_u+T_g)}$$

If instant Doppler $f_d$ is equal to zero, then, $\|R\|=ME_p^2$. Since the instant Doppler is much smaller than the subcarrier space, Phase $\tilde{\theta}$ of R may be small. Therefore, it may be assumed that $\|R\| \approx ME_p^2$. As a result, Eqn. (15) may be simplified as:

$$f_d = \frac{\sqrt{1-\cos(\tilde{\theta})}}{2\pi(T_u+T_g)}. \quad (16)$$

The normalized frequency offset estimation given by the discriminator may be expressed as:

$$\hat{\delta}_f = \frac{N}{2\pi D(N+G)} \cdot \tilde{\theta} \quad (17)$$

Using the approximation $\cos(\theta)=1-\theta^2/2$, the relationship between the normalized measured frequency offset $\hat{\delta}_f$ and the instant Doppler satisfies:

$$\hat{\delta}_f = \frac{\sqrt{2} f_d \cdot NT_s}{2} = \frac{\sqrt{2} f_d}{2\Delta f} = \lambda f_d \quad (18)$$

where the scaling factor $$\lambda = \frac{\sqrt{2}}{2\Delta f},$$

$T_s$ is the sampling time and $\Delta f$ is the subcarrier spacing in Hz.

Figure 6A:
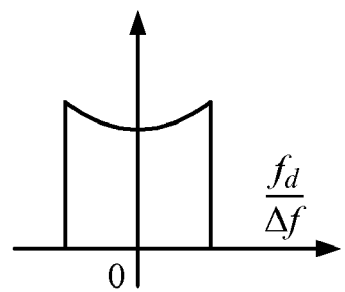
FIG. 6 illustrates the relationship between measured frequency offset and instant Doppler for a high CINR case.
Figure 6B:
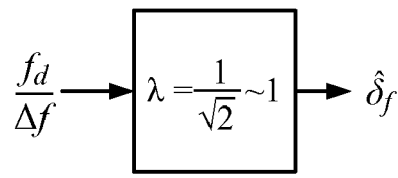
Figure 6C:
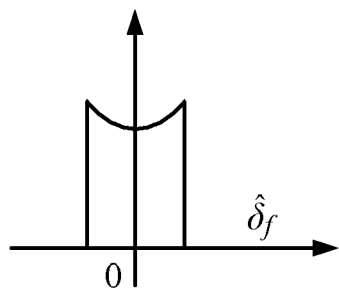

The above scenarios indicate a possible relationship between the measured frequency offset and the instant Doppler, which may be derived or approximated depending on the channel conditions. FIG. 6 illustrates the relationship between the normalized frequency offset $\hat{\delta}_f$ and instant Doppler $f_d$ at high CINR. 6-A illustrates the instant Doppler normalized by the subcarrier space $\Delta f$. The ratio $f_d/\Delta f$ is used as an input to the discriminator in 6-B. FIG. 6-C illustrates the normalized frequency offset $\hat{\delta}_f$, which may be equal to $\lambda f_d/\Delta f$, where $\lambda$ is a scaling factor.

The present disclosure shows that in high CINR, the measured frequency offset $\hat{\delta}_f$ and the instant Doppler spread $f_d$ of the fading channel have similar statistical characteristics (Eqn (18)). The value of the scaling factor $\lambda$ may be derived based on the channel profile, pilot number in each symbol and the measurement period. For high CINR, the scaling factor $\lambda$ may be within the range (0.707, 1). Simulation results show that the variance of the discriminator output, $\text{var}(\hat{\delta}_f)$, may depend highly on the CINR especially for CINR<10 dB. The variance of the discriminator output may also depend on the Doppler spread value and the channel profile. For certain embodiments, the Pedesterian A (PedA) channel with one dominant path leads to a higher variance value than other channel models.

In high CINR range (CINR>10 dB), the range of the scaling factor $\lambda$ may be small within the range of (0.71, 1). Thus, the maximum channel Doppler $f_D$ may be roughly classified using the statistics of the measured frequency offset that may be the output of the FTL discriminator.

Exemplary Doppler Spread Classification Algorithm

The above theoretical analysis demonstrates the relationship between measured residual frequency offset and the instant Doppler. It also shows that the statistics of the discriminator output may be used to classify the Doppler spread of the fading channel especially at medium and high CINR range.

Statistics of the discriminator output in the open loop for the standard channel models such as additive white Gaussian noise (AWGN), pedestrian A (PedA), pedestrian B (PedB), vehicular A (VehA) and enhanced typical urban (ETU) channels over CINR rage between –5 dB and 20 dB with increments of 5 dB have been analyzed and simulation results are presented below. The mean value and +/–90% range are plotted in the FIGS. 14 to 16. It is shown that the upper and lower boundaries related to +/–90% range are almost symmetric corresponding to the mean value. In our simulations, the typical low, medium and high Doppler spreads are considered as 50 Hz, 300 Hz and 600 Hz, respectively. These values are applied to the standard channels. It is demonstrated that the statistics of the discriminator output are quite related to the Doppler spread at medium to high CINR range (CINR>10 dB), which matches the theoretical analysis. Thus, based on the 90% upper/lower boundary value estimations, the Doppler spread may be classified.

Figure 7:
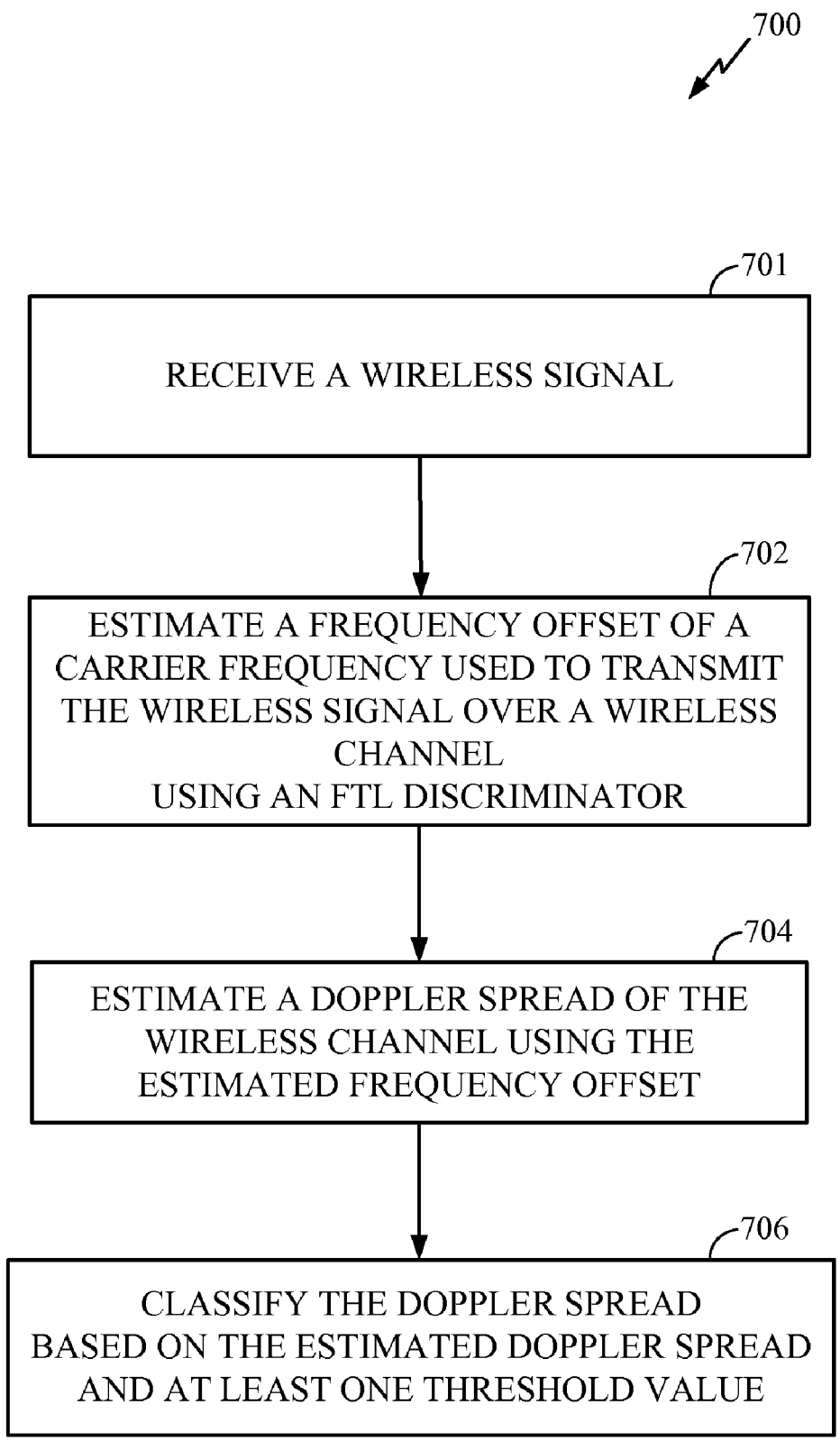
FIG. 7 illustrates the process of classifying the Doppler spread based on the FTL discriminator in accordance with certain embodiments of the present disclosure.

FIG. 7 illustrates example operations 700 for classifying the Doppler spread based on the output of an FTL discriminator. At 701, a wireless signal is received. At 702, a frequency offset of a carrier frequency used to transmit the wireless signal over a wireless channel may be estimated using an FTL discriminator. At 704, an estimate of a Doppler spread of the wireless channel may be formed by utilizing the estimated frequency offset, for example, using operations described below with reference to FIG. 8. At 706, the Doppler spread may be classified by comparing the statistics of the FTL discriminator output with one or more predefined threshold values.

Figure 8:
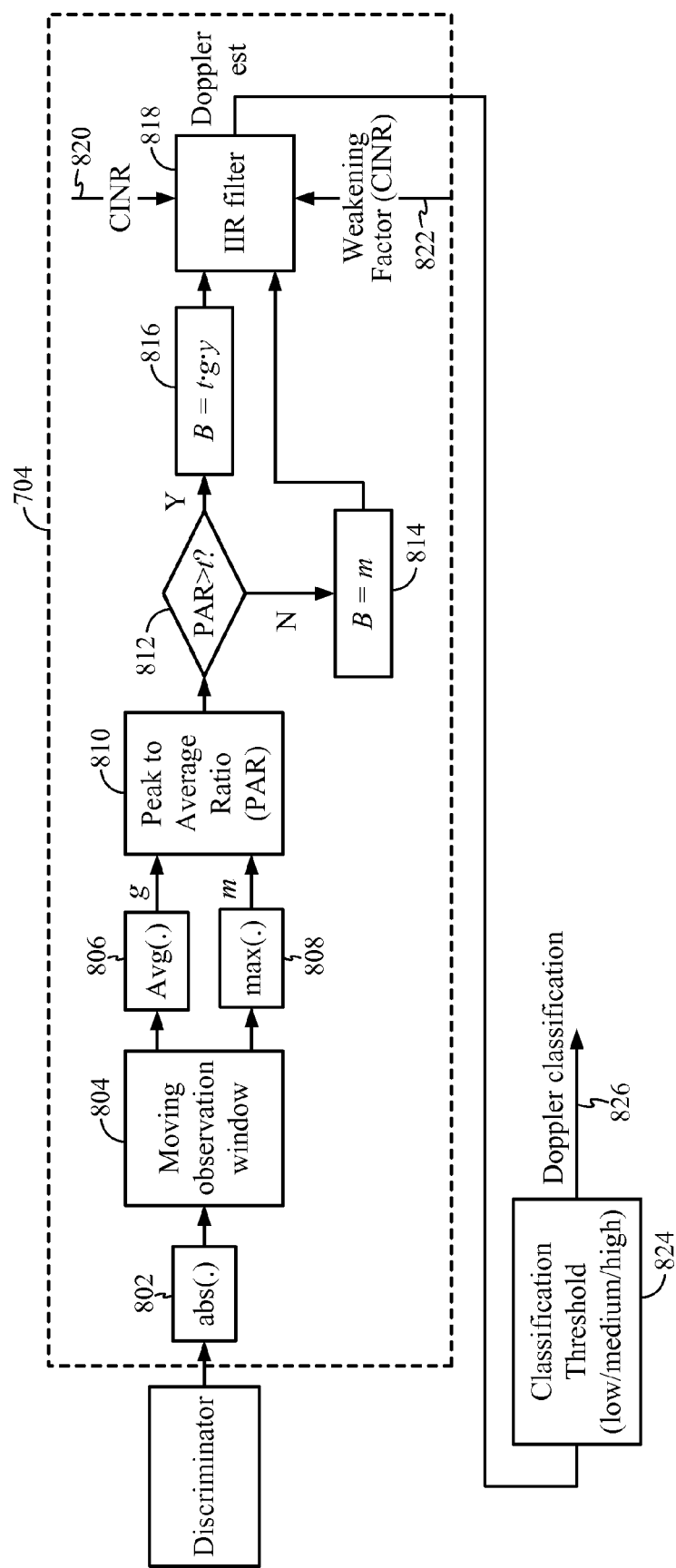
FIG. 8 illustrates example components capable of classifying Doppler spread in accordance with certain embodiments of the present disclosure.

A block diagram of logic for classifying the Doppler spread is illustrated in FIG. 8. In certain embodiments, symmetric upper/lower boundary values of the output of a FTL discriminator may be considered. As illustrated in FIG. 8, an FTL discriminator outputs the measured frequency offset $\hat{\delta}_f$, which may be provided as an input to the absolute value block 802. At 804, a moving observation window stores the last L frames. For certain embodiments, size of the sliding window, L may be equal to 50 samples, and the values may be stored at a rate of every frame (e.g., 5 ms). A maximum value 808 and a mean value 806 may be calculated from previously observed values.

Based on the maximum and mean values, peak to average ratio (PAR) 810 may be calculated. For certain embodiments, the 90% upper/lower boundary value B may be approximated as 812-816:

$$B = \begin{cases} t \cdot g \cdot \gamma & PAR > t \\ m & PAR < t \end{cases} \quad (19)$$

where g and m are the mean and the maximum values, respectively. For certain embodiments, the threshold, t may be chosen as 3. The parameter $\gamma$ is a calibration factor that may be chosen based on the channel impulse response (CIR) length of the channel. For certain embodiments, the calibration factor $\gamma$ may be equal to 2/3 for channels with small delay spread, such as the PedA channel. Otherwise, $\gamma$ may be equal to one.

In Eqn (19), the PAR value helps to smooth the estimate of the 90% upper/lower boundary value. For certain embodiments, when the distribution of the discriminator output is Gaussian, the probability density of the absolute value of the discriminator output may be expressed as:

$$p(x) = \frac{2}{\sqrt{2\pi}\,\delta} e^{-\frac{x^2}{2\delta^2}}, x > 0 \quad (20)$$

The average of the absolute value of the discriminator output may be calculated as:

$$g = \int_0^{+\infty} x \frac{2}{\sqrt{2\pi}\,\delta} e^{-\frac{x^2}{2\delta^2}} = \frac{2\delta}{\sqrt{2\pi}} \quad (21)$$

The cumulative distribution probability with x less than 3 g satisfies that:

$$P(x < 3g) = 2 \cdot \int_0^{3g} \frac{1}{\sqrt{2\pi}\,\delta} e^{-\frac{x^2}{2\delta^2}} dx \quad (22)$$
$$= 2 \int_0^{\frac{6\delta}{\sqrt{2\pi}}} \frac{1}{\sqrt{2\pi}\,\delta} e^{-\frac{x^2}{2\delta}} dx = 1 - 2 \cdot Q\left(\sqrt{2} \cdot \frac{3}{\sqrt{\pi}}\right)$$
$$= \text{erf}\left(\frac{3}{\sqrt{\pi}}\right) \approx 0.98$$

For certain embodiments, by considering Eqn (22), the value of 3 may be chosen for the threshold t. Thus, it may be reasonable to use 3.g as the 90% upper/lower boundary value estimation if PAR>3. In addition, by choosing the value B=tg$\gamma$ when the PAR is larger than the threshold value, the 90% upper/lower boundary value estimation may avoid noise corruption.

The value of B from blocks 814 and 816 in FIG. 8 enters an adaptive IIR filter 818 to smooth the estimated boundary value. A forgetting factor for the IIR filter may adaptively be adjusted based on the estimated CINR 820. Also, a weakening factor 822 is introduced at low CINR range to suppress the estimated boundary value at low CINR range. The forgetting factor and the weakening factor may be determined based on real measurements or simulations. It should be noted that the forgetting factor and the weakening factor are constant values in cases where the CINR is larger than 10 dB, as shown in FIG. 9. Thus, we set the values of the parameters to be constants based on the simulation results shown in FIG. 9.

Thus, the Doppler spread may be classified (826) as low, medium or high based on the predefined thresholds 824. In the simulations discussed below, the thresholds for Doppler spread classification are chosen such that low Doppler spread is below 100 Hz, medium Doppler spread is between 100 Hz and 250 Hz and high Doppler spread is above 250 Hz. The threshold setting is based on the Doppler estimation with the typical low, medium and high Doppler (i.e., 50 Hz, 300 Hz and 600 Hz) in various channels such as PedA, PedB, VehA or ETU.

Exemplary Simulation Results

The simulation results shown in this section demonstrate that the Doppler spread may be classified as low, medium or high, based on the statistical characteristics of the discriminator output (with D=2) for various channels such as PedA, PedB, VehA and ETU. For lower values of the CINR, with CINR<10 dB, the values for weakening factor and forgetting factor may be selected as in FIG. 9.

For certain embodiments of the present disclosure, the initial value in the IIR filter may be 120 Hz and the length of the moving observation window may be 50. Here, we only focus on the high CINR range (e.g., CINR>10 dB) which may be the operation point for 16 QAM and 64 QAM in the fading channels. It is important to classify correctly the Doppler spread at medium to high CINR range to improve the channel estimation for the 16 QAM and 64 QAM demodulation. FIGS. 10 to 13 show that Doppler spread can be classified accurately in the medium to high CINR range (CINR>10 dB) for all the typical standard channel models.

Figure 10:
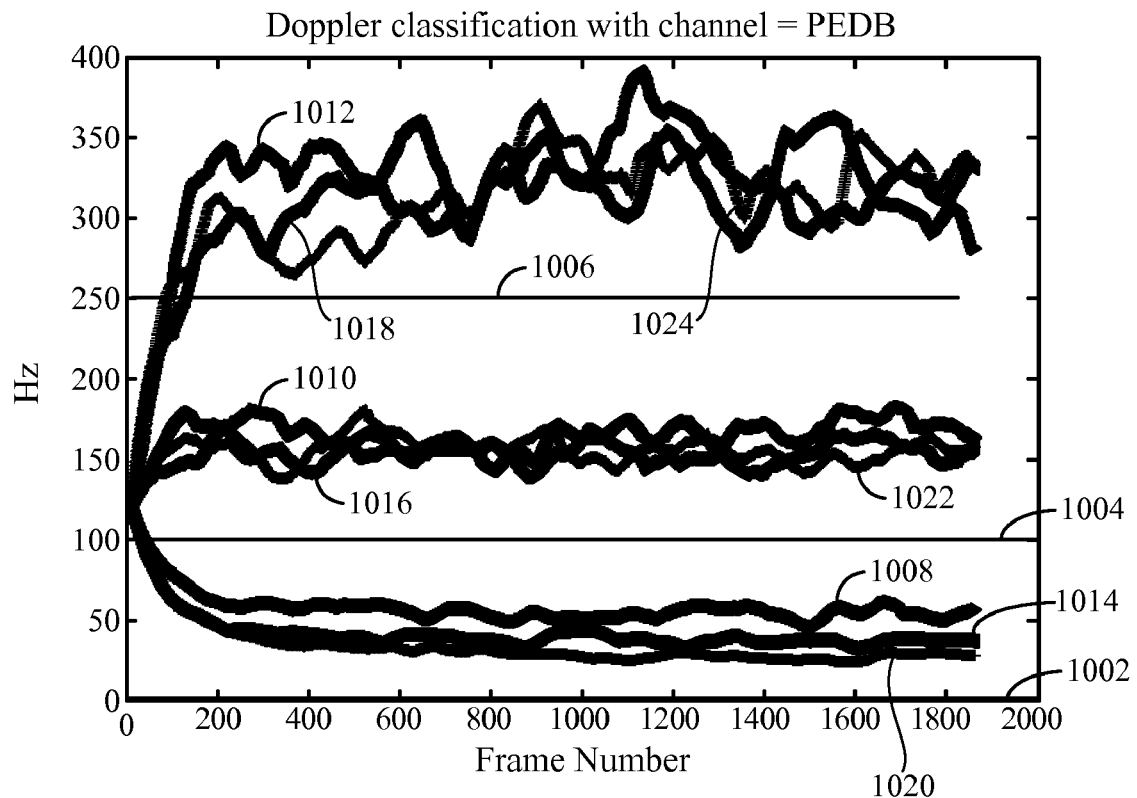
FIG. 10 illustrates Doppler classification with CINR>10 dB for the Pedestrian B channel in accordance with certain embodiments of the present disclosure.
Figure 10:
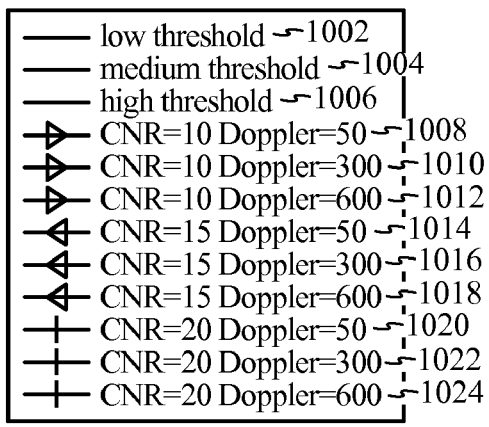

FIG. 10 illustrates the Doppler classification with CINR>10 dB for the PedB channel. The low 1002, medium 1004 and high 1006 thresholds show 0 Hz, 100 Hz, and 250 Hz, respectively. Simulations are performed for three values of CINR equal to 10 dB, 15 dB and 20 dB. The curves 1008, 1014 and 1020 show the results for Doppler equal to 50 and CINR equal to 10, 15 and 20 dB, respectively. The curves 1010, 1016 and 1022 show the results for Doppler equal to 300 and CINR equal to 10, 15 and 20 dB, respectively. The curves 1012, 1018 and 1024 show the results for Doppler equal to 600 and CINR equal to 10, 15 and 20 dB, respectively.

Figure 11:
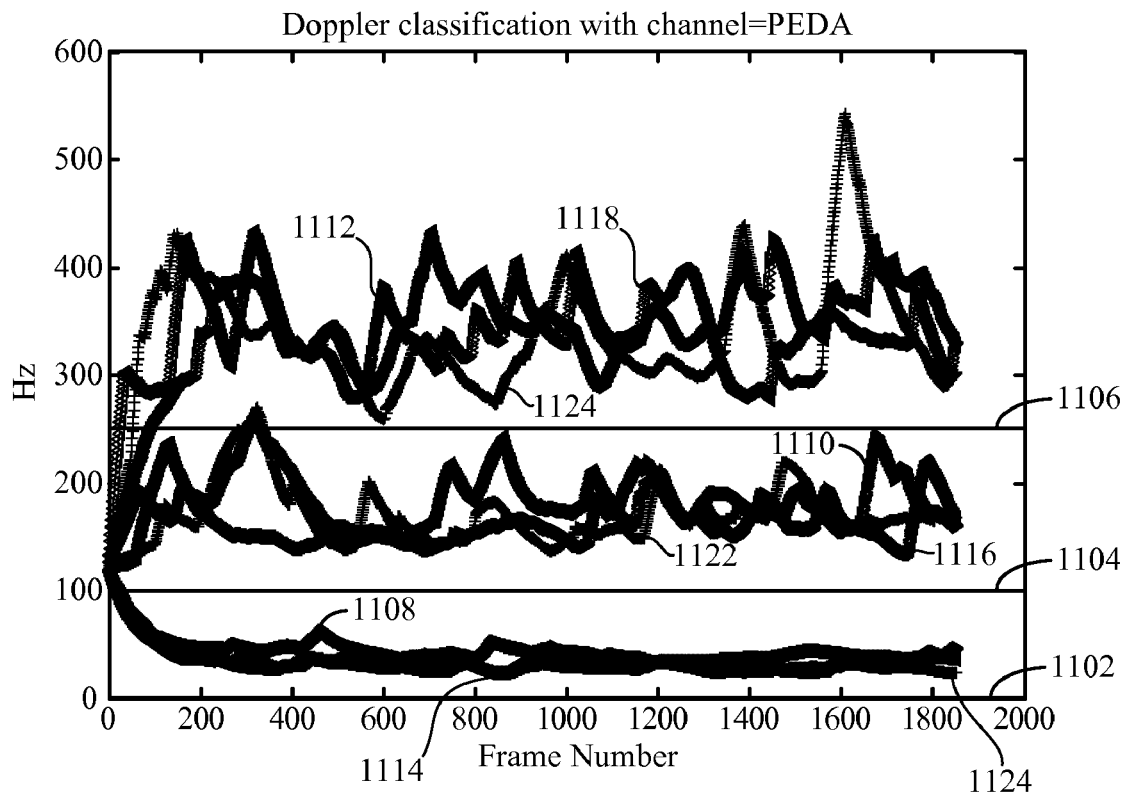
FIG. 11 illustrates Doppler classification with CINR>10 dB for the Pedestrian A channel in accordance with certain embodiments of the present disclosure.

FIG. 11 illustrates the Doppler classification with CINR>10 dB for the PedA channel. The low 1102, medium 1104 and high 1106 thresholds show 0 Hz, 100 Hz, and 250 Hz, respectively. Simulations are performed for three values of CINR equal to 10 dB, 15 dB and 20 dB. The curves 1108, 1114 and 1120 show the results for Doppler equal to 50 and CINR equal to 10, 15 and 20 dB, respectively. The curves 1110, 1116 and 1122 show the results for Doppler equal to 300 and CINR equal to 10, 15 and 20 dB, respectively. The curves 1112, 1118 and 1124 show the results for Doppler equal to 600 and CINR equal to 10, 15 and 20 dB, respectively.

Figure 12:
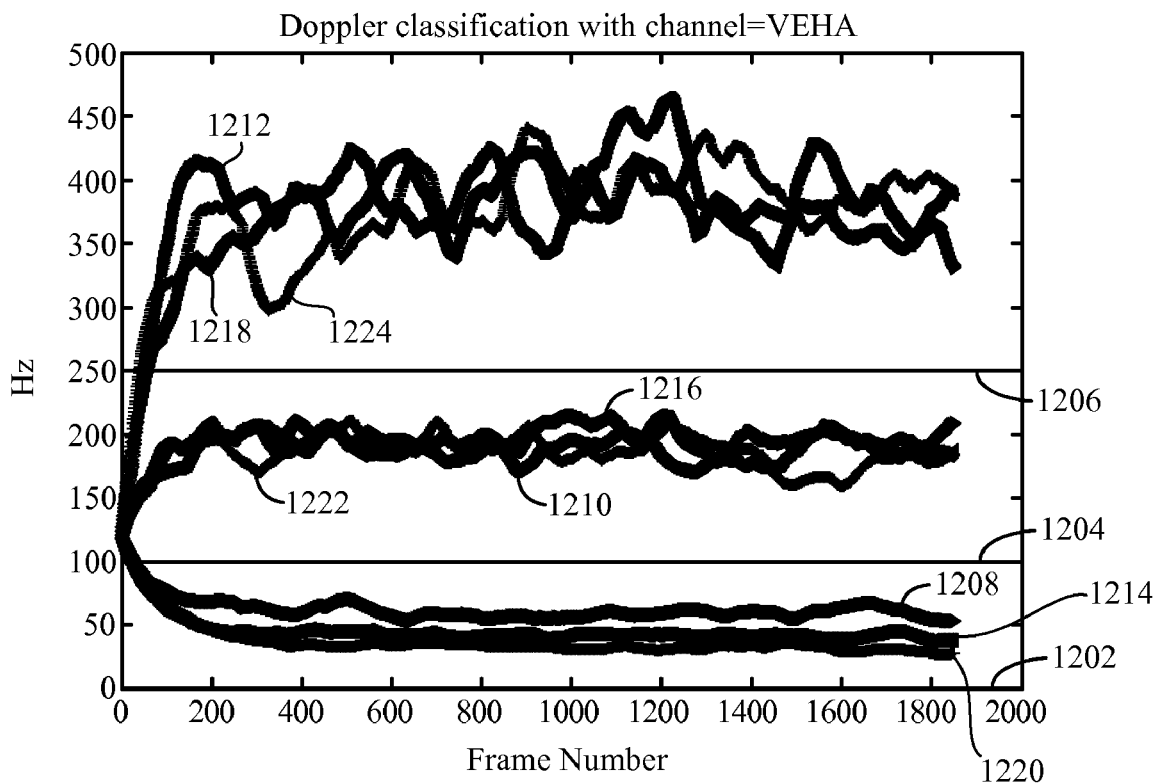
FIG. 12 illustrates Doppler classification with CINR>10 dB for the Vehicular A channel in accordance with certain embodiments of the present disclosure.

FIG. 12 illustrates the Doppler classification with CINR>10 dB for the VehA channel. The low 1202, medium 1204 and high 1206 thresholds show 0 Hz, 100 Hz, and 250 Hz, respectively. Simulations are performed for three values of CINR equal to 10 dB, 15 dB and 20 dB. The curves 1208, 1214 and 1220 show the results for Doppler equal to 50 and CINR equal to 10, 15 and 20 dB, respectively. The curves 1210, 1216 and 1222 show the results for Doppler equal to 300 and CINR equal to 10, 15 and 20 dB, respectively. The curves 1212, 1218 and 1224 show the results for Doppler equal to 600 and CINR equal to 10, 15 and 20 dB, respectively.

Figure 13:
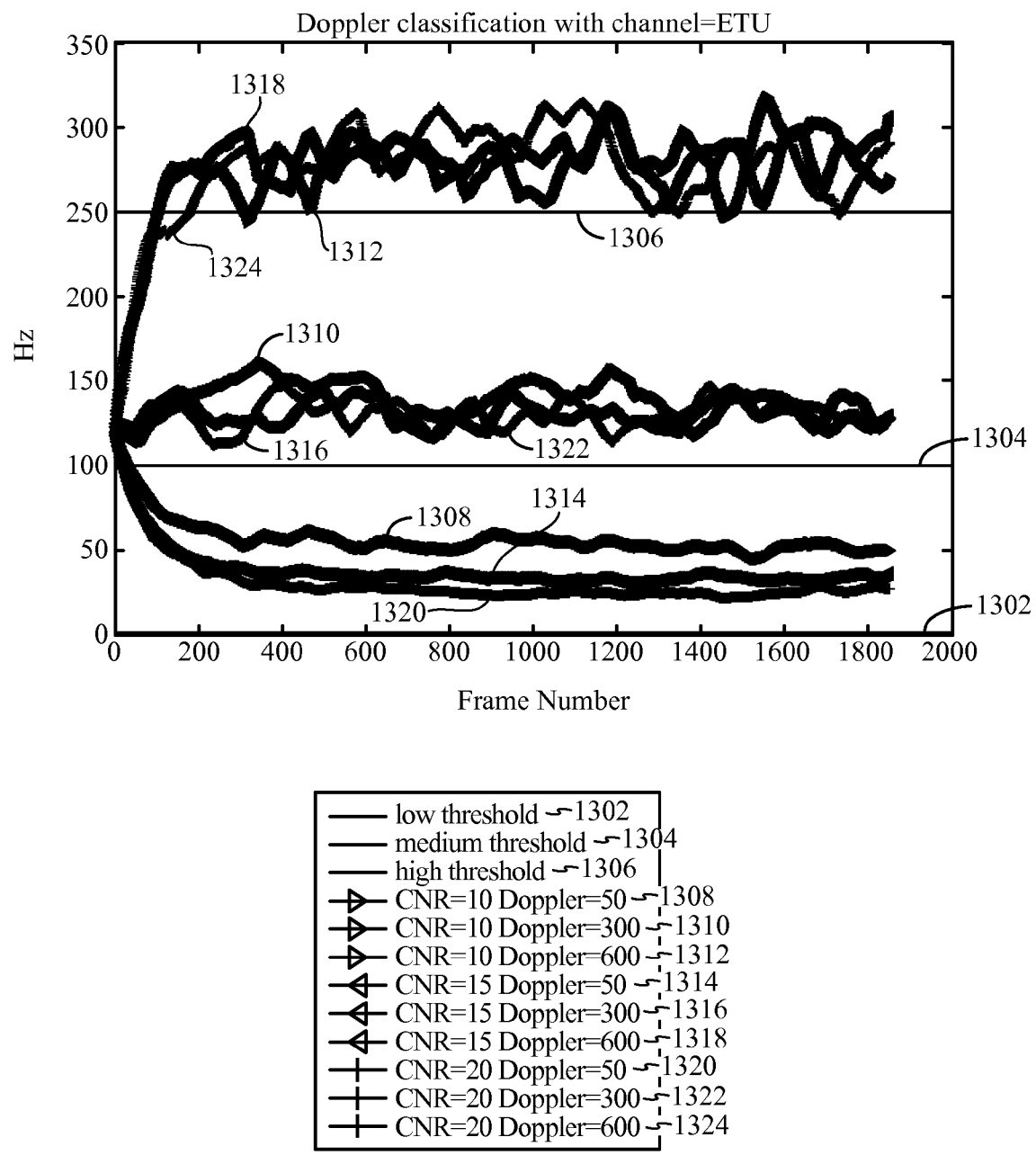
FIG. 13 illustrates Doppler classification with CINR>10 dB for the ETU channel in accordance with certain embodiments of the present disclosure.

FIG. 13 illustrates the Doppler classification with CINR>10 dB for the enhanced typical urban (ETU) channel. The low 1302, medium 1304 and high 1306 thresholds show 0 Hz, 100 Hz, and 250 Hz, respectively. Simulations are performed for three values of CINR equal to 10 dB, 15 dB and 20 dB. The curves 1308, 1314 and 1320 show the results for Doppler equal to 50 and CINR equal to 10, 15 and 20 dB, respectively. The curves 1310, 1316 and 1322 show the results for Doppler equal to 300 and CINR equal to 10, 15 and 20 dB, respectively. The curves 1312, 1318 and 1324 show the results for Doppler equal to 600 and CINR equal to 10, 15 and 20 dB, respectively.

Exemplary Statical Charasteristics of the Discriminator Output

Figure 14:
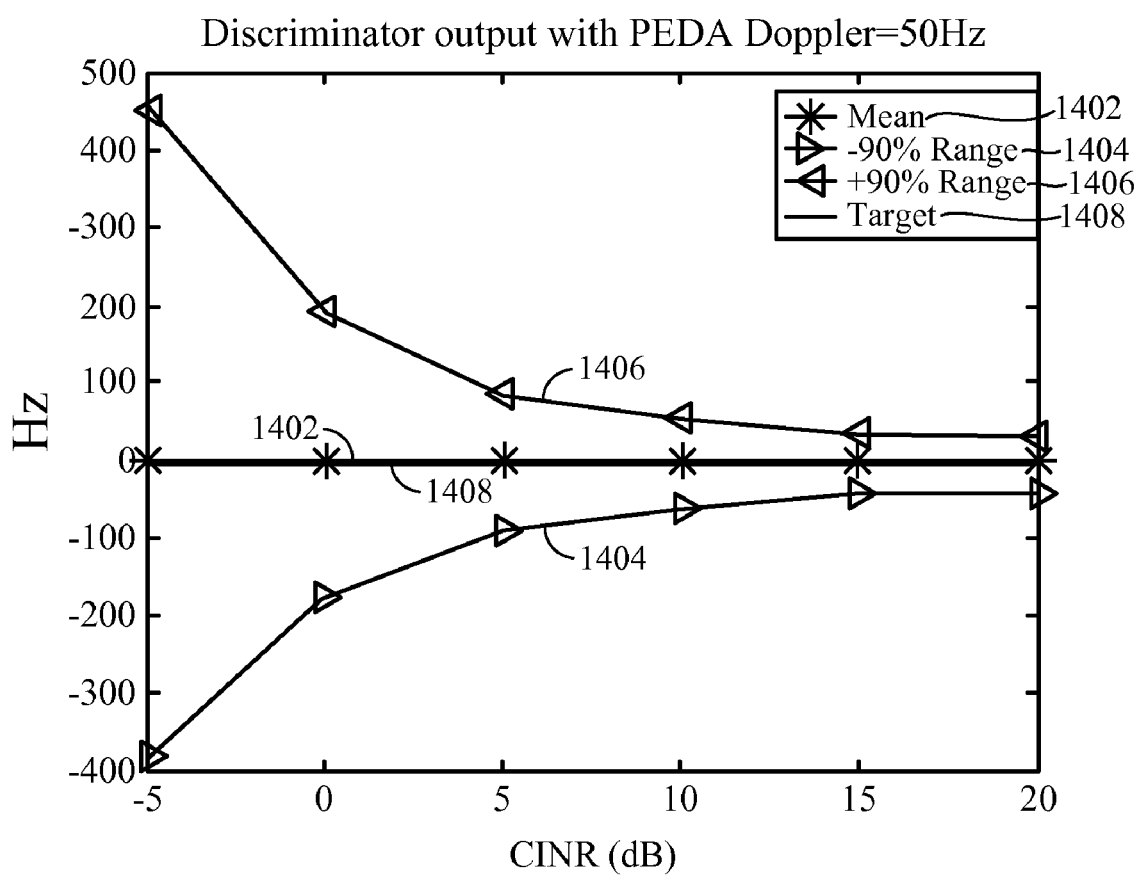
FIG. 14 illustrates statistic characteristics of discriminator output in Pedestrian A channel for a Doppler spread of 50 Hz in accordance with certain embodiments of the present disclosure.
Figure 15:
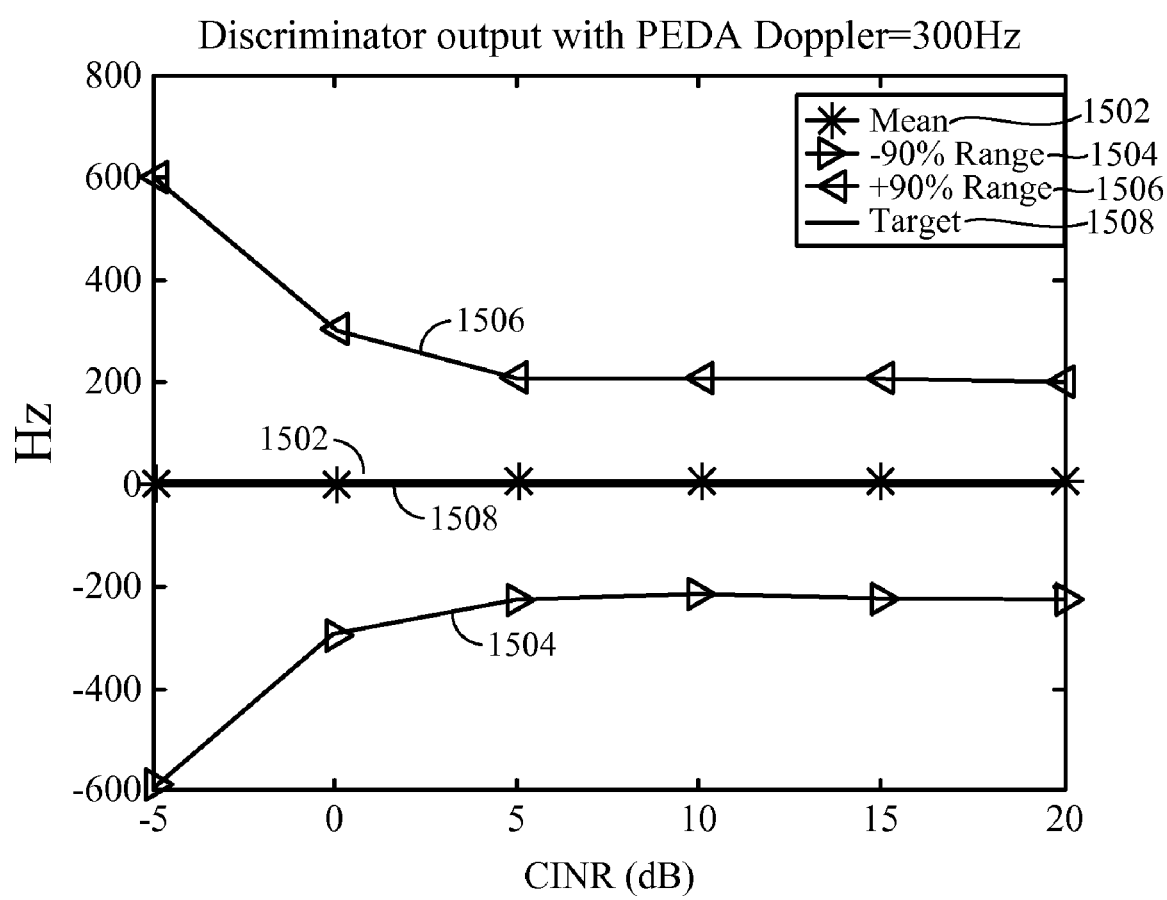
FIG. 15 illustrates statistic characteristics of discriminator output in Pedestrian A channel for a Doppler spread of 300 Hz in accordance with certain embodiments of the present disclosure.
Figure 16:
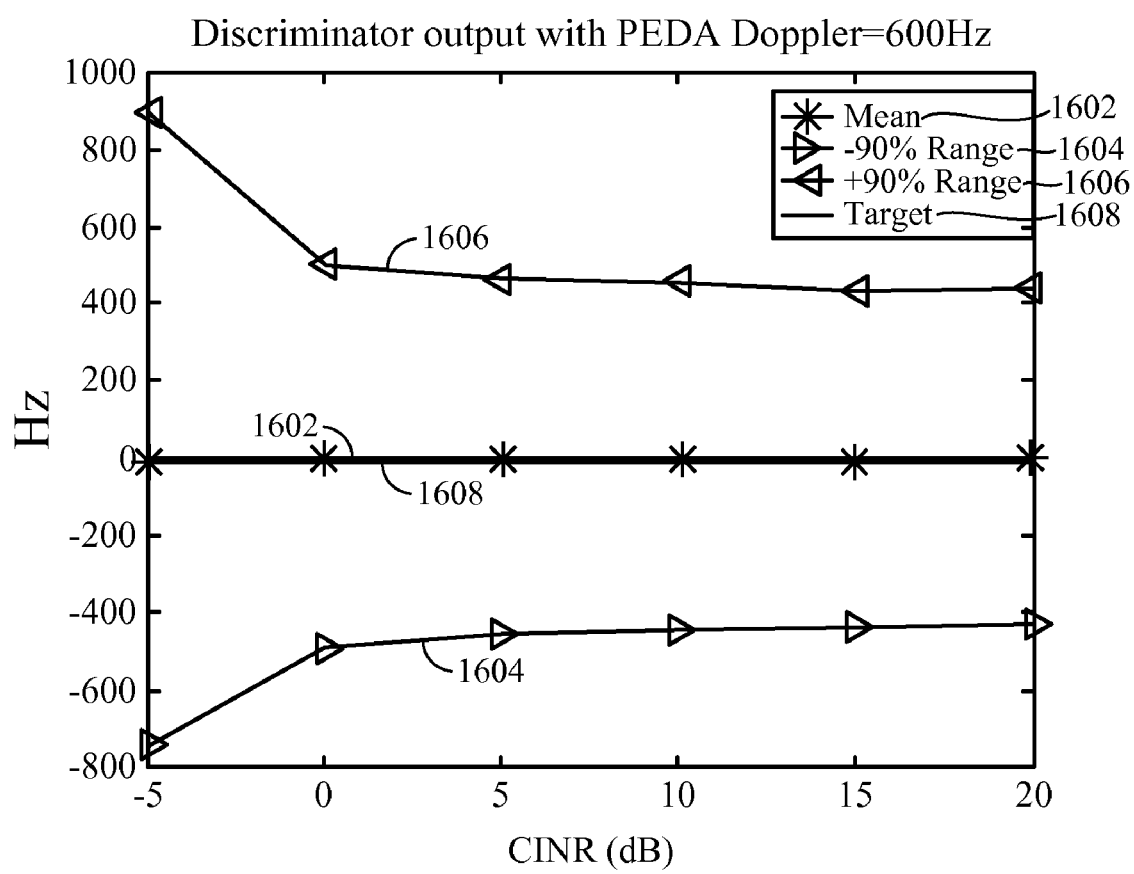
FIG. 16 illustrates statistic characteristics of discriminator output in Pedestrian A channel for a Doppler spread of 600 Hz in accordance with certain embodiments of the present disclosure.

FIGS. 14-16 illustrate the statistical characteristics of the discriminator (D=2) output for PEDA channel in the low, medium and high Doppler spreads that may be chosen as 50 Hz, 300 Hz and 600 Hz, respectively. Other standard channel models such as ETU, PEDB and VEHA may also perform similar to the PedA channel. According to the simulation results about the initial acquisition algorithm, the residual frequency error after fractional frequency offset estimation is mostly below 0.1 for CINR>−10 dB, thus, in the following simulation, the normalized input frequency offset for FTL is set to 0.1. The pilots in group zero in the $1^{st}$ PUSC zone are used for the FTL discriminator.

FIGS. 14, 15 and 16 show the discriminator output for the PedA channel with Doppler equal to 50, 300 and 600 dB, respectively. In these figures, the 90% range means that 90% of the statistical samples that are greater than the mean are upper-bounded by 1406, 1506 and 1606 curves, while 90% of the statistical samples that are smaller than the mean are lower-bounded by the 1404, 1504 and 1604 curves. It should be noted that the curves in these figures are down shifted by the input frequency offset. Thus, the value of mean and target is zero instead of the input frequency offset. By doing so, the upper and lower boundary related to +/−90% range is almost symmetric corresponding to the x-axis. Simulation results show that the +/−90% range is almost constant for a certain Doppler value at high CINR range (i.e., CINR>10 dB). Based on the estimation of the 90% range boundary, the maximum channel Doppler $f_D$ can roughly be classified.

Figure 7A:
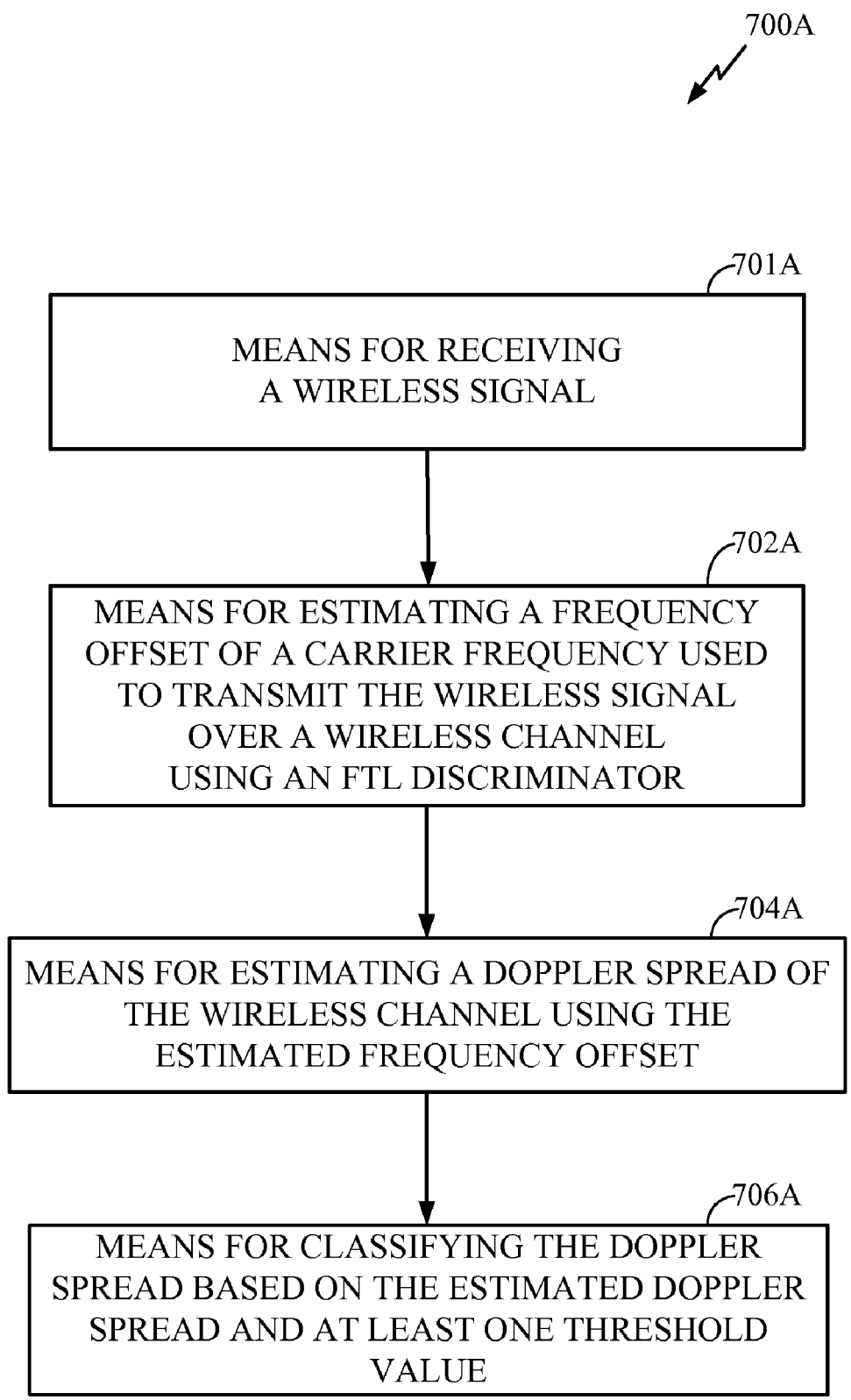
FIG. 7A illustrates example components capable of performing the operations illustrated in FIG. 7.

The various operations of methods described above may be performed by various hardware and/or software component(s) and/or module(s) corresponding to means-plus-function blocks illustrated in the Figures. For example, blocks 702-706 illustrated in FIG. 7 correspond to means-plus-function blocks 702A-706A illustrated in FIG. 7A. More generally, where there are methods illustrated in Figures having corresponding counterpart means-plus-function Figures, the operation blocks correspond to means-plus-function blocks with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications, comprising:
   receiving a wireless signal;
   calculating a peak to average ratio (PAR) of the wireless signal;
   estimating a frequency offset of a carrier frequency used to transmit the wireless signal over a wireless channel;
   estimating a Doppler spread of the wireless channel using the estimated frequency offset and an equation based on the PAR to obtain an estimated Doppler spread, a first equation being used if the PAR exceeds a threshold value, and a second equation being used if the PAR does not exceed the threshold value; and
   classifying the Doppler spread based on the estimated Doppler spread and at least one threshold value.

2. The method of claim 1, wherein estimating the frequency offset comprises: utilizing a frequency tracking loop (FTL).

3. The method of claim 1, wherein classifying the Doppler spread comprises:
   classifying the Doppler spread as one of at least three classifications based on a comparison of the estimated Doppler spread and at least two threshold values.

4. An apparatus for wireless communications, comprising:
   logic for receiving a wireless signal;
   logic for calculating a peak to average ratio (PAR) of the wireless signal;
   logic for estimating a frequency offset of a carrier frequency used to transmit the wireless signal over a wireless channel;
   logic for estimating a Doppler spread of the wireless channel using the estimated frequency offset and an equation based on the PAR to obtain an estimated Doppler spread, a first equation being used if the PAR exceeds a threshold value, and a second equation being used if the PAR does not exceed the threshold value; and
   logic for classifying the Doppler spread based on the estimated Doppler spread and at least one threshold value.

5. The apparatus of claim 4, wherein the logic for estimating the frequency offset comprises:
   logic for utilizing a frequency tracking loop (FTL).

6. The apparatus of claim 4, wherein the logic for classifying the Doppler spread comprises:
   logic for classifying the Doppler spread as one of at least three classifications based on a comparison of the estimated Doppler spread and at least two threshold values.

7. An apparatus for wireless communications, comprising:
   means for receiving a wireless signal;
   means for calculating a peak to average ratio (PAR) of the wireless signal;
   means for estimating a frequency offset of a carrier frequency used to transmit the wireless signal over a wireless channel;
   means for estimating a Doppler spread of the wireless channel using the estimated frequency offset and an equation based on the PAR to obtain an estimated Doppler spread, a first equation being used if the PAR exceeds a threshold value, and a second equation being used if the PAR does not exceed the threshold value; and means for classifying the Doppler spread based on the estimated Doppler spread and at least one threshold value.

8. The apparatus of claim 7, wherein the means for estimating the frequency offset comprises:
means for utilizing a frequency tracking loop (FTL).

9. The apparatus of claim 7, wherein the means for classifying the Doppler spread comprises:
means for classifying the Doppler spread as one of at least three classifications based on a comparison of the estimated Doppler spread and at least two threshold values.

10. A computer-program product for wireless communications, comprising a non-transitory computer readable medium having instructions stored thereon, the instructions being executable by one or more processors and the instructions comprising:
instructions for receiving a wireless signal;
instructions for calculating a peak to average ratio (PAR) of the wireless signal;
instructions for estimating a frequency offset of a carrier frequency used to transmit the wireless signal over a wireless channel;
instructions for estimating a Doppler spread of the wireless channel using the estimated frequency offset and an equation based on the PAR to obtain an estimated Doppler spread, a first equation being used if the PAR exceeds a threshold value, and a second equation being used if the PAR does not exceed the threshold value; and
instructions for classifying the Doppler spread based on the estimated Doppler spread and at least one threshold value.

11. The computer-program product of claim 10, wherein the instructions for estimating the frequency offset comprise:
instructions for utilizing a frequency tracking loop (FTL).

12. The computer-program product of claim 10, wherein the instructions for classifying the Doppler spread comprise:
instructions for classifying the Doppler spread as one of at least three classifications based on a comparison of the estimated Doppler spread and at least two threshold values.

* * * * *